(12) United States Patent
Chen et al.

(10) Patent No.: US 10,839,559 B2
(45) Date of Patent: Nov. 17, 2020

(54) METHOD AND APPARATUS FOR FULL COLOR DATA PROCESSING FOR 3D OBJECTS

(71) Applicant: ZHUHAI SEINE TECHNOLOGY CO., LTD., Zhuhai (CN)

(72) Inventors: Wei Chen, Zhuhai (CN); Xiaokun Chen, Zhuhai (CN); Dongqing Xiang, Zhuhai (CN)

(73) Assignee: ZHUHAI SEINE TECHNOLOGY CO., LTD., Zhuhai (CN)

(*) Notice: Subject to any disclaimer, the term of this patent is extended or adjusted under 35 U.S.C. 154(b) by 120 days.

(21) Appl. No.: 16/177,705

(22) Filed: Nov. 1, 2018

(65) Prior Publication Data

US 2019/0073797 A1 Mar. 7, 2019

Related U.S. Application Data

(63) Continuation of application No. PCT/CN2017/083890, filed on May 11, 2017.

(30) Foreign Application Priority Data

Dec. 15, 2016 (CN) .......................... 2016 1 1162438

(51) Int. Cl.
*G06T 7/90* (2017.01)
*B33Y 30/00* (2015.01)
(Continued)

(52) U.S. Cl.
CPC ................ *G06T 7/90* (2017.01); *B33Y 30/00* (2014.12); *B33Y 50/00* (2014.12); *G06T 19/20* (2013.01);
(Continued)

(58) Field of Classification Search
CPC ..... G06T 7/90; G06T 19/20; G06T 2219/008; G06T 2207/10008; G06T 2207/10024;
(Continued)

(56) References Cited

U.S. PATENT DOCUMENTS

| 2014/0257549 A1* | 9/2014 | Swartz .................. B29C 64/386 700/119 |
| 2016/0082657 A1* | 3/2016 | Swartz .................. B29C 64/141 425/110 |
| 2017/0072642 A1* | 3/2017 | Sakamoto ............... G06T 17/20 |

FOREIGN PATENT DOCUMENTS

| CN | 101602315 A | 12/2009 |
| CN | 103258346 A | 8/2013 |

(Continued)

OTHER PUBLICATIONS

The World Intellectual Property Organization (WIPO) International Search Report for PCT/CN2017/083890 dated Aug. 24, 2017 6 Pages.

*Primary Examiner* — Jon Chang
(74) *Attorney, Agent, or Firm* — Anova Law Group, PLLC (57) ABSTRACT

Method and apparatus for full color data processing for 3D objects are provided. The method includes: performing a layering process on a target object to determine slice-layer data of each layer, wherein the slice-layer data includes layer-color data and layer-structure data, the layer-color data represents color information of the target object, and the layer-structure data represents a printing location of the target object; and analyzing the layer-color data and the layer-structure data when the layer-color data is consistent with background color data of the target object and analyzing the layer-color data when the layer-color data is inconsistent with the background color data of the target object, (Continued)

thereby determining a layer color of the target object and determining printing information of the target object.

14 Claims, 7 Drawing Sheets

(51) Int. Cl.
    *B33Y 50/00*     (2015.01)
    *G06T 19/20*     (2011.01)

(52) U.S. Cl.
    CPC ............... *G06T 2207/10008* (2013.01); *G06T 2207/10024* (2013.01); *G06T 2219/008* (2013.01); *G06T 2219/2012* (2013.01)

(58) Field of Classification Search
    CPC .. G06T 2219/2012; G06T 2207/10012; B33Y 30/00; B33Y 50/00
    See application file for complete search history.

(56) References Cited

FOREIGN PATENT DOCUMENTS

| | | |
|---|---|---|
| CN | 104723563 A | 6/2015 |
| CN | 104786496 A | 7/2015 |
| EP | 0713788 A2 | 5/1996 |

\* cited by examiner

| Performing a layering process on a target object to determine slice-layer data of each layer, where the slice-layer data includes layer-color data and layer-structure data, the layer-color data represents color information of the target object, and the layer-structure data represents a printing location of the target object | ～ 101 |

| Analyzing the layer-color data and the layer-structure data when the layer-color data is consistent with background color data of the target object and analyzing the layer-color data when the layer-color data is inconsistent with the background color data of the target object, thereby determining a layer color of the target object and determining printing information of the target object | ～ 102 |

FIG. 1

Performing a scanning process on a target object to obtain target object information of the target object; converting the target object information into a data format recognizable by layering and slicing software; performing the layering processing on the converted target object information to generate bitmap images; analyzing the bitmap images to determine the slice-layer data of each layer; and converting a color format of the layer-color data of each layer to obtain processed slice-layer data of each layer — 101

When there is one bitmap image, analyzing the layer-color data of each pixel dot contained in the bitmap image one by one to determine content represented by the layer-color data; when the layer-color data is consistent with the background color data of the target object, analyzing the layer-structure data of each pixel dot contained in the bitmap image one by one to determine content represented by the layer-structure data, and based on contents represented by the layer-color data and the layer-structure data, determining the layer color of the target object and determining the printing information of the target object; when the layer-color data is inconsistent with the background color data of the target object, based on the content represented by the layer-color data, determining the layer color of the target object and determining the printing information of the target object — 1021

When the bitmap images include a first bitmap image and a second bitmap image, extracting and analyzing the layer-color data of each pixel dot contained in the first bitmap image to determine content represented by the layer-color data; when the layer-color data is consistent with the background color data of the target object, extracting and analyzing the layer-structure data of each pixel dot contained in the second bitmap image that has one-to-one correspondence with each pixel dot contained in the first bitmap image to determine the content represented by the layer-structure data, and based on the content represented by the layer-color data and the content represented by the layer-structure data, determining the layer color of the target object and determining the printing information of the target object; when the layer-color data is inconsistent with the background color data of the target object, based on the content represented by the layer-color data, determining the layer color of the target object and determining the printing information of the target object — 1022

METHOD AND APPARATUS FOR FULL COLOR DATA PROCESSING FOR 3D OBJECTS

CROSS-REFERENCE TO RELATED APPLICATIONS

This application is a continuation application of International Application No. PCT/CN2017/083890, filed on May 11, 2017, which claims priority to Chinese Patent Application No. 201611162438.5, filed on Dec. 15, 2016. The above enumerated patent applications are incorporated herein by reference in their entity.

TECHNICAL FIELD

The present disclosure generally relates to the field of rapid molding technology and, in particular, relates to methods and apparatus for full color data processing for three dimensional (3D) objects.

BACKGROUND

In rapid molding technology, also known as rapid prototyping or additive manufacturing technology, materials are successively stacked layer by layer based on a slicing by a three-dimensional (3D) model to fabricate a 3D object.

At present, 3D objects are fabricated using the rapid molding technologies, including a fused deposition modeling (FDM) technology, a stereolithography (SLA) technology, a selective laser sintering (SLS) technology, a laminated object manufacturing (LOM) technology, or a three-dimensional inkjet printing (3DP) technology, etc.

Among these methods, when a printing 3D model is fully colored, color information of the 3D model needs to be recognized. Especially when a sliced slice-layer has a color consistent with the background image of the slice-layer, a printing system is unable to distinguish between the background information that does not need to be printed and the slice-layer that needs to be printed under such color information. For example, a slice-layer of the 3D model may include a white color portion that needs to be printed while the background color of the slide-layer image may also be white but does not need to be printed. Because the color consistency makes the printing system unable to distinguish which white color needs to be printed and which white color does not need to be printed, mistakes may occur. The white color that needs to be printed may be omitted and the white color that does not need to be printed may be printed by mistake.

SUMMARY

One aspect of the present disclosure provides a method for full color data processing method for 3D objects, including: performing a layering process on a target object to determine slice-layer data of each layer, where the slice-layer data includes layer-color data and layer-structure data, the layer-color data represents color information of the target object, and the layer-structure data represents a printing location of the target object; and analyzing the layer-color data and the layer-structure data when the layer-color data is consistent with background color data of the target object and analyzing the layer-color data when the layer-color data is inconsistent with the background color data of the target object, thereby determining a layer color of the target object and determining printing information of the target object.

Another aspect of the present disclosure provides an apparatus for full color data processing apparatus for 3D objects, including: a scanner, configured to perform a scanning process on a target object to obtain target object information of the target object; a memory, storing program instructions for a method for full color data processing; and a processor, coupled to the scanner and the memory and, when executing the program instructions, configured to: perform a layering process on a target object to determine slice-layer data of each layer, wherein the slice-layer data includes layer-color data and layer-structure data, the layer-color data represents color information of the target object, and the layer-structure data represents a printing location of the target object; and analyze the layer-color data and the layer-structure data when the layer-color data is consistent with background color data of the target object and analyze the layer-color data when the layer-color data is inconsistent with the background color data of the target object, thereby determining a layer color of the target object and determining printing information of the target object.

Another aspect of the present disclosure provides a non-transitory computer readable storage medium containing computer-executable program instructions for, when executed by a processor, performing a method for full color data processing for 3D objects, the method comprising: performing a layering process on a target object to determine slice-layer data of each layer, wherein the slice-layer data includes layer-color data and layer-structure data, the layer-color data represents color information of the target object, and the layer-structure data represents a printing location of the target object; and analyzing the layer-color data and the layer-structure data when the layer-color data is consistent with background color data of the target object and analyzing the layer-color data when the layer-color data is inconsistent with the background color data of the target object, thereby determining a layer color of the target object and determining printing information of the target object.

Other aspects of the present disclosure can be understood by those skilled in the art in light of the description, the claims, and the drawings of the present disclosure.

DESCRIPTION OF THE DRAWINGS

To clearly illustrate features, objects and advantages of the present disclosure, the drawings used in the description of the embodiments are briefly described below. Obviously, the accompanying drawings described below illustrate some but not all embodiments of the present disclosure. For those skilled in the art, other drawings may also be obtained based on these drawings without any creative work.

FIG. 2 illustrates a flowchart of another exemplary full color data processing method for 3D objects according to some embodiments of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

The present disclosure provides methods and apparatus for full color data processing for printing three dimensional (3D) objects to solve the problems that the color consistency may make the printing system or a printer unable to distinguish the white color that does not need to be printed from the white color that needs to be printed, the white color that needs to be printed may be omitted, and the white color that does not need to be printed may be printed by mistake.

Figure 1:
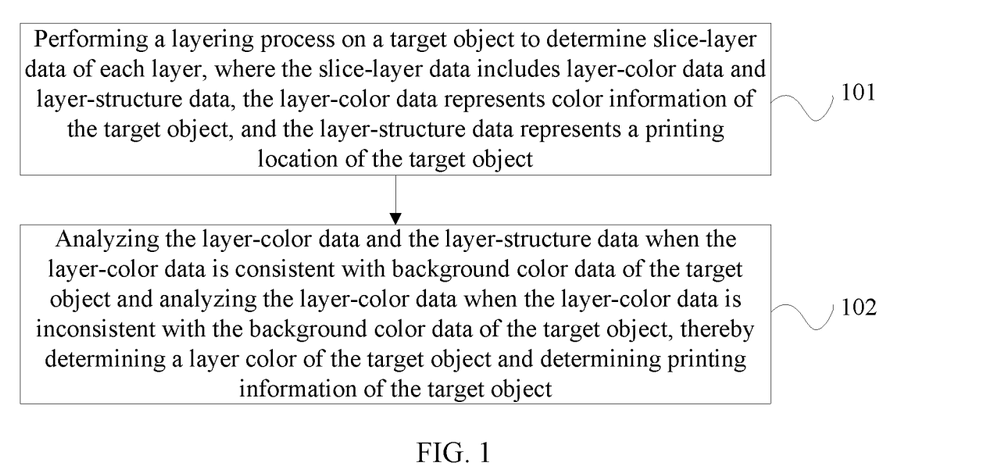
FIG. 1 illustrates a flowchart of an exemplary full color data processing method for 3D objects according to some embodiments of the present disclosure.

FIG. 1 illustrates a flowchart of an exemplary full color data processing method for 3D objects according to some embodiments of the present disclosure. As shown in FIG. 1, the method may include the following exemplary steps. First, step 101 may be performed.

In step 101: performing a layering process on a target object to determine slice-layer data of each layer, where the slice-layer data includes layer-color data and layer-structure data, the layer-color data represents color information of the target object, and the layer-structure data represents a printing location of the target object.

In one embodiment, a 3D target object may be obtained. Slicing software may be used to perform the layering process on the 3D target object to obtain a plurality of slice-layers of the 3D target object and then the slice-layer data of the plurality of slice-layers of the 3D target object. The slice-layer data of each layer may include the layer-color data and the layer-structure data.

The layer-color data represents color distribution of the 3D target object, that is, color information of the 3D target object, after the slicing software performs the layering process on the 3D target object. The layer-structure data represents the physical location of the 3D target object, that is, the printing location of the 3D target object, after the slicing software performs the layering process on the 3D target object.

In step 102: analyzing the layer-color data and the layer-structure data when the layer-color data is consistent with background color data of the target object and analyzing the layer-color data when the layer-color data is inconsistent with the background color data of the target object, thereby determining a layer color of the target object and determining printing information of the target object.

In one embodiment, after the slicing software performs the layering process on the 3D target object to obtain the slice-layer data for printing, an analysis may be performed on the layer-color data and the layer-structure data of the slice-layer data of each layer of the 3D target object to determine the layer color of the 3D target object and to determine the printing information of the 3D target object. For example, the analysis may be performed on the layer-color data and the layer-structure data when the layer-color data is consistent with the background color data of the target object, and the analysis may be performed on the layer-color data when the layer-color data is inconsistent with the background color data of the target object, thereby determining the layer-color of the target object and determining the printing information of the target object.

In one embodiment, the layering process may be performed on the target object to determine the slice-layer data of each layer. The slice-layer data may include the layer-color data and the layer-structure data. The layer-color data may represent the color information of the target object and the layer-structure data may represent the printing location of the target object. The analysis may be performed on the layer-color data and the layer-structure data when the layer-color data is consistent with the background color data of the target object, and the analysis may be performed on the layer-color data when the layer-color data is inconsistent with the background color data of the target object, thereby determining the layer-color of the target object and determining the printing information of the target object. Thus, a method for full color data processing for 3D objects is provided to perform the layering process on the target object and to analyze the layer-color data and the layer-structure data obtained from the layering process. The full color information of the 3D target object may be represented in the data format to distinguish when a color of a slice-layer of the 3D target object is consistent with the image background color. Printing omissions or printing by mistake may be avoided.

FIG. 2 illustrates a flowchart of another exemplary full color data processing method for 3D objects according to some embodiments of the present disclosure. As shown in FIG. 2, the method builds on the method in FIG. 1. For example, step 101 may include performing a scanning process on the target object to obtain target object information of the target object; converting the target object information into a data format recognizable by layering and slicing software; performing the layering processing on the converted target object information to generate bitmap images; analyzing the bitmap images to determine the slice-layer data of each layer; and converting a color format of the layer-color data of each layer to obtain processed slice-layer data of each layer.

In one embodiment, the target object information of the 3D target object may be obtained. The target object information may be converted into the data format recognizable by slicing software of a processing terminal for layering. The data format of the target object information recognizable by the slicing software may include stereolithography (STL) format, polygon file format (PLY), or virtual reality modeling language (VWRL) format. The target object information may include a plurality of layers. The slicing software may slice, i.e., perform the layering processing on the target object information after the format conversion to generate the bitmap image. The bitmap image may be analyzed to obtain the slice-layer data of each layer. The bitmap image may include a dot array image formed by combining a plurality of pixel dots. The slice-layer data of each layer may include data information of each pixel dot. The layer-color data of each layer may include the color data of each pixel dot and the layer-structure data of each layer may include the structure data of each pixel dot.

In the existing technologies, the color data and the structure data included in the slice-layer data may belong to a same data group. When the layering process generates the bitmap image, the background color of the bitmap image may be defined to be different from any of the colors of the 3D target object. That is, the background color of the bitmap image may never repeat any color of the 3D target object. At the same time the color data is retrieved, whether the color data belongs to a printing portion may be determined. When the color represented by the color data is different from the color of the background image, printing may be needed. Otherwise, the color may be the background color and printing may not be needed.

In other embodiments of the present disclosure, the color represented by the layer-color data may not be limited to avoid repeating the color of the background image to achieve the objective of representing full color in the data format. In one embodiment, after the slicing by the layering process is performed, the layer-color data and the layer-structure data of the slice-layer data may belong to two different data groups having different contents and representing different printing information, respectively. That is, the layer-color data may represent the color information of the 3D target object and the layer-structure data may represent the printing location of the 3D target object. Further, the slice-layer data of each layer may also include material information of the 3D target object. The material information may be configured according to actual requirements to indicate whether the 3D target object is printed by a single material or a plurality of materials.

In the layering process performed on the 3D target object to obtain the layer-color data, the layer-color data may be directly drawn by drawing software. For example, CAD, Pro E, SolidWorks, Unigraphics, or 3ds Max, etc. may be used to draw the layer-color data. Further, a basic structural model of the 3D target object may be drawn by the drawing software.

The layer-color data may include data formed by combining red color (R), green color (G), and blue color (B). When being used in printing, the slice-layer data obtained from the layering process performed by the slicing software on the 3D target object may be converted to layer-printing data. For example, the color format of the layer-color data of the slice-layer data of each layer may be converted to obtain the processed slice-layer data of each layer suitable for printing. For example, the layer-color data may be stored based on a color system including the red (R), green (G), and blue (B) combination. In actual printing, the data stored based the color system including the red (R), green (G), and blue (B) combination may be converted. The layer-color data storing the red (R), green (G), and blue (B) combination in each pixel dot may be converted to store a cyan (C), magenta (M), and yellow (Y) combination, or a cyan (C), magenta (M), yellow (Y), and black (K) combination, or a cyan (C), magenta (M), yellow (Y), and white (W) combination, or other color combinations to obtain the converted layer-color data. For example, the layer-color data storing the red (R), green (G), and blue (B) combination in each pixel dot may be converted to store the cyan (C), magenta (M), and yellow (Y) combination in each pixel dot.

As shown in FIG. 2, step 102 in FIG. 1 may be implemented in two options. Step 1021 is a first option for implementing step 102. Step 1022 is a second option for implementing step 102. Step 1021 may include the following sub-steps.

When there is one bitmap image, the layer-color data of each pixel dot contained in the bitmap image may be analyzed one by one to determine content represented by the layer-color data.

When the layer-color data is consistent with the background color data of the target object, the layer-structure data of each pixel dot contained in the bitmap image may be analyzed one by one to determine the content represented by the layer-structure data. Based on the content represented by the layer-color data and the content represented by the layer-structure data, the layer color of the target object may be determined and the printing information of the target object may be determined.

When the layer-color data is inconsistent with the background color data of the target object, based on the content represented by the layer-color data, the layer color of the target object may be determined and the printing information of the target object may be determined.

In one embodiment, when there is one bitmap image, the slice-layer data of each pixel dot contained in the bitmap image may include the layer-color data and the layer-structure data. The layer-color data may include data formed in a color system format. The layer-color data and the layer-structure data may belong to two opposite groups of data. For example, the layer-color data of a certain pixel dot contained in the bitmap image may store data in the color system including the red (R), green (G), and blue (B) combination. White color may be represented by (255, 255, 255). The layer-structure data may be 0 or 1. Thus, the slice-layer data of the pixel dot may be represented by (255, 255, 255, 0), (0, 25,255, 255), (255, 0, 255, 255), or (255, 255, 0, 255).

Further, the layer-color data and the layer-structure data of each pixel dot contained in the bitmap image may be analyzed one by one to determine the layer color of the 3D target object. When there is one bitmap image, the layer-color data and the layer-structure data of each pixel dot contained in the bitmap image may be extracted to analyze data of the red (R), green (G), and blue (B) combination of each pixel dot. Thus, the content represented by the layer-color data may be determined. At the same time, the layer-structure data of each pixel dot may be analyzed to determine the content represented by the layer-structure data.

For example, the layer-color data of each pixel dot contained in the bitmap image may be analyzed one by one to determine the content represented by the layer-color data. When the layer-color data is consistent with the background color data of the target object, the layer-structure data of each pixel dot contained in the bitmap image may be analyzed one by one to determine the content represented by the layer-structure data. As such, based on the contents represented by the layer-color data and the layer-structure data, the layer color of the target object may be determined and the printing information of the target object may be determined. When the layer-color data is inconsistent with the background color data of the target object, it may not be necessary to analyze the layer-structure data of each pixel dot contained in the bitmap image one by one to determine the content represented by the layer-structure data. As such, based on the content represented by the layer-color data directly, the layer color of the target object may be determined and the printing information of the target object may be determined. Thus, the method may be simplified, and working resources may be saved.

Figure 3:
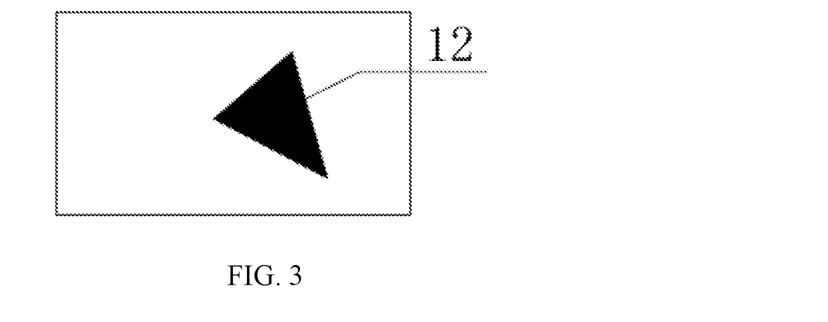
FIG. 3 illustrates an exemplary bitmap image generated according to the exemplary method in FIG. 2 according to some embodiments of the present disclosure.
Figure 4:
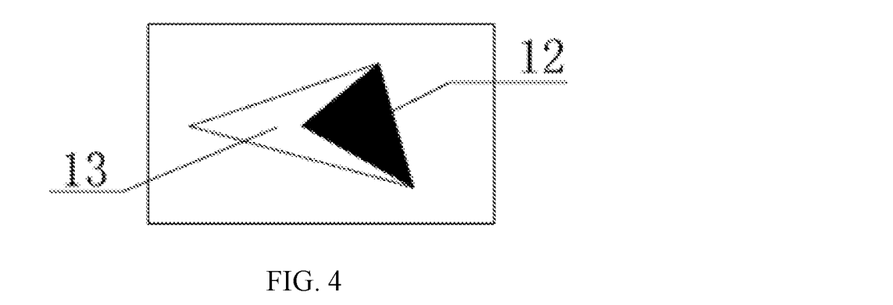
FIG. 4 illustrates a first schematic diagram of a 3D target object according to the exemplary method in FIG. 2 according to some embodiments of the present disclosure.

FIG. 3 illustrates an exemplary bitmap image generated according to the exemplary method in FIG. 2 according to some embodiments of the present disclosure. As shown in FIG. 3, the bitmap image may be a 24-bit bitmap. Because the 3D target object includes a white portion, the white portion cannot be distinguished from the background image. FIG. 4 illustrates a first schematic diagram of a 3D target object according to the exemplary method in FIG. 2 according to some embodiments of the present disclosure. For illustrative purposes, as shown in FIG. 4, the 3D target object may include a non-white portion 12 and a white portion 13.

Figure 5:
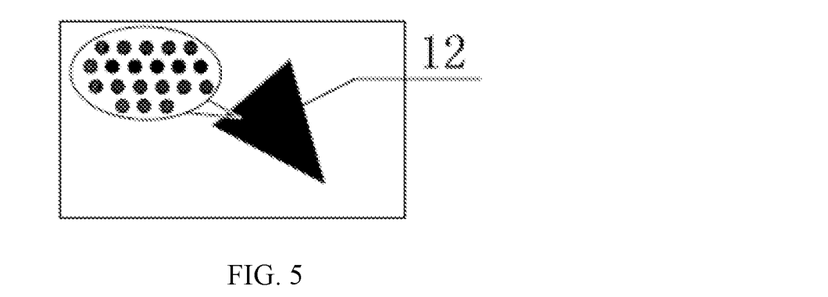
FIG. 5 illustrates a first schematic diagram of a pixel dot array in a non-white portion of a 3D target object according to the exemplary method in FIG. 2 according to some embodiments of the present disclosure.

FIG. 5 illustrates a first schematic diagram of a pixel dot array in a non-white portion of a 3D target object according to the exemplary method in FIG. 2 according to some embodiments of the present disclosure. As shown in FIG. 5, the pixel dot array may represent the non-white portion 12 of the 3D target object in FIG. 4. The layering process may be performed on the 3D target object to obtain the layer-color data and the layer-structure data. Then, a certain pixel dot contained in the non-white portion 12 may be extracted and analyzed. The layer-color data and the layer-structure data may be stored for the pixel dot. The layer-color data may store data in the color system of the red (R), green (G), and blue (B) combination. As shown in FIG. 5, the pixel dot may be within the non-white portion 12 of the 3D target object while the background color of the bitmap image is white. Thus, it is determined that the pixel dot may belong to the printing portion without the need to extract the layer-structure data.

Figure 6:
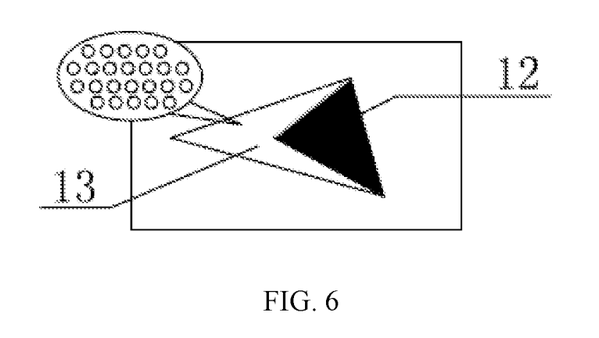
FIG. 6 illustrates a first schematic diagram of a pixel dot array in a non-white portion of a 3D target object according to the exemplary method in FIG. 2 according to some embodiments of the present disclosure.

FIG. 6 illustrates a first schematic diagram of a pixel dot array in a non-white portion of a 3D target object according to the exemplary method in FIG. 2 according to some embodiments of the present disclosure. As shown in FIG. 6, the pixel dot array may represent the white portion 13 of the 3D target object in the background image in FIG. 4. The layering process may be performed on the 3D target object to obtain the layer-color data and the layer-structure data. Then, a certain pixel dot contained in the white portion 13 may be extracted and analyzed. The layer-color data and the layer-structure data may be stored for the pixel dot. The layer-color data may store data in the color system of the red (R), green (G), and blue (B) combination. Because the pixel dot is white, whether the pixel dot is within the background color of the bitmap image or is the white portion 13 of the 3D target object may not be determined. Thus, the layer-structure data corresponding to the layer-color data may be extracted and analyzed to determine the content represented by the layer-structure data. The layer-structure data may include two opposite groups of data, i.e., 0 or 1. 0 may indicate the background image portion in the bitmap image and 1 may indicate the physical portion of the 3D target object in the bitmap image. Alternatively, 1 may indicate the background image portion in the bitmap image and 0 may indicate the physical portion of the 3D target object in the bitmap image.

Referring to FIG. 2, step 1022 may be a second option for implementing step 102 in FIG. 1. Step 1022 may include the following sub-steps.

When the bitmap images include a first bitmap image and a second bitmap image, the layer-color data of each pixel dot contained in the first bitmap image may be extracted and analyzed to determine the content represented by the layer-color data.

When the layer-color data is consistent with the background color data of the target object, the layer-structure data of each pixel dot contained in the second bitmap image that has one-to-one correspondence with each pixel dot contained in the first bitmap image may be extracted and analyzed to determine the content represented by the layer-structure data. Based on the content represented by the layer-color data and the content represented by the layer-structure data, the layer color of the target object may be determined and the printing information of the target object may be determined.

When the layer-color data is inconsistent with the background color data of the target object, based on the content represented by the layer-color data, the layer color of the target object may be determined and the printing information of the target object may be determined.

The first bitmap image may be a 24-bit bitmap image and the second bitmap image may be a binary bitmap image.

In one embodiment, when the bitmap images include two bitmap images, the two bitmap images may include a first bitmap image and a second bitmap image. A pixel dot contained in the first bitmap image may include the layer-color data. A pixel dot contained in the second bitmap image may include the layer-structure data. The first bitmap image may be a 24-bit bitmap image and the second bitmap image may be a binary bitmap image. For example, the layer-color data of each pixel dot contained in the first bitmap image may store data in the color system of the red (R), green (G), and blue (B) combination. White color may be represented by (255, 255, 255). The layer-structure data of each pixel dot contained in the second bitmap image that has one-to-one correspondence with each pixel dot contained in the first bitmap image may be 0 or 1.

As such, the layer-color data of each pixel dot contained in the first bitmap image and the layer-structure data of each pixel dot contained in the second bitmap image that has one-to-one correspondence with each pixel dot contained in the first bitmap image may be analyzed one by one to determine the layer color. For example, the layer-color data of a certain pixel dot contained in the first bitmap image may be extracted. The red (R), green (G), and blue (B) combination data stored for the pixel dot may be analyzed. By analyzing the red (R), green (G), and blue (B) combination data, the content represented by the layer-color data of the pixel dot may be determined. Then, the layer-structure data of the pixel dot contained in the second bitmap image that has one-to-one correspondence with the pixel dot contained in the first bitmap image may be extracted to determine the content represented by the layer-structure data of the pixel dot.

For example, when the layer-color data is consistent with the background color data of the target object, the layer-structure data of each pixel dot contained in the second bitmap image that has one-to-one correspondence with each pixel dot contained in the first bitmap image may be extracted and analyzed to determine the content represented by the layer-structure data. Based on the contents represented by the layer-color data and the layer-structure data, the layer color of the target object may be determined and the printing information of the target object may be determined. When the layer-color data is inconsistent with the background color data of the target object, it may not be necessary to extract and analyze the layer-structure data of each pixel dot contained in the second bitmap image that has one-to-one correspondence with each pixel dot contained in the first bitmap image. Based on the content represented by the layer-color data directly, the layer color of the target object may be determined and the printing information of the target object may be determined.

Figure 7:
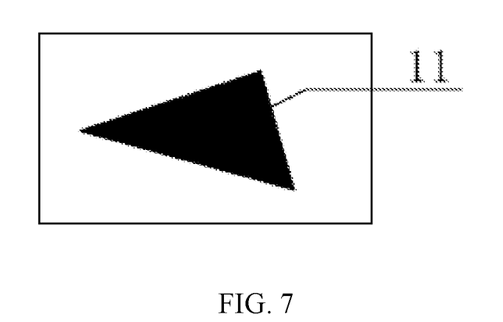
FIG. 7 illustrates a second bitmap image generated according to the exemplary method in FIG. 2 according to some embodiments of the present disclosure.

FIG. 7 illustrates a second bitmap image generated according to the exemplary method in FIG. 2 according to some embodiments of the present disclosure. As shown in FIG. 7, a second bitmap image of the 3D target object 11 may be generated by the layering process. The second bitmap image may be a binary bitmap image. The layer-structure data may be binary image data.

Figure 8:
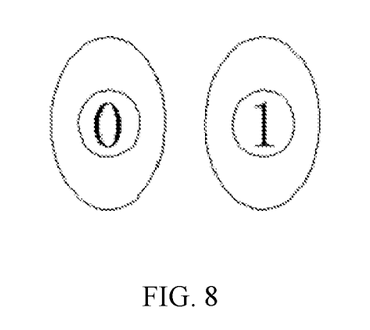
FIG. 8 illustrates an exemplary schematic diagram of layer-structure data stored in a pixel dot contained in a second bitmap image generated according to the exemplary method in FIG. 2 according to some embodiments of the present disclosure.

FIG. 8 illustrates an exemplary schematic diagram of layer-structure data stored in a pixel dot contained in a second bitmap image generated according to the exemplary method in FIG. 2 according to some embodiments of the present disclosure. As shown in FIG. 8, the layer-structure data may be stored for a certain pixel dot contained in the second bitmap image of the 3D target object 11 generated by a layering process. The layer-structure data may include two opposite groups of data, i.e., 0 or 1. 0 may indicate the background image portion in the binary bitmap image and 1 may indicate the physical portion of the 3D target object in the binary bitmap image. Alternatively, 1 may indicate the background image portion in the binary bitmap image and 0 may indicate the physical portion of the 3D target object in the binary bitmap image.

Figure 9:
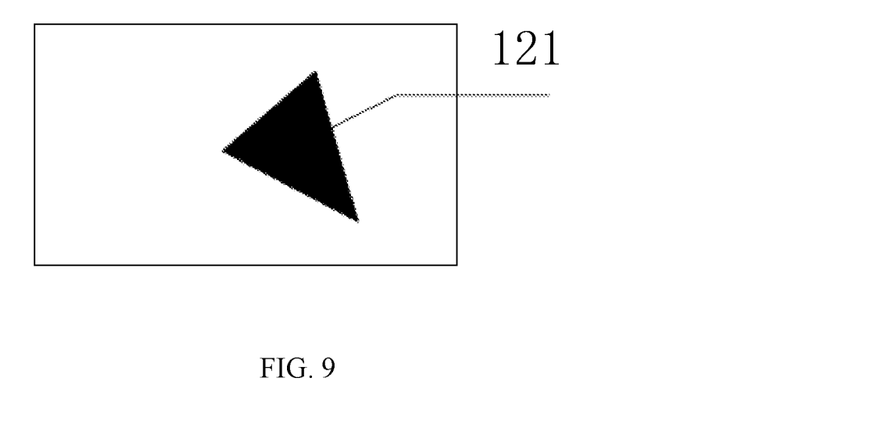
FIG. 9 illustrates a first bitmap image generated according to the exemplary method in FIG. 2 according to some embodiments of the present disclosure.
Figure 10:
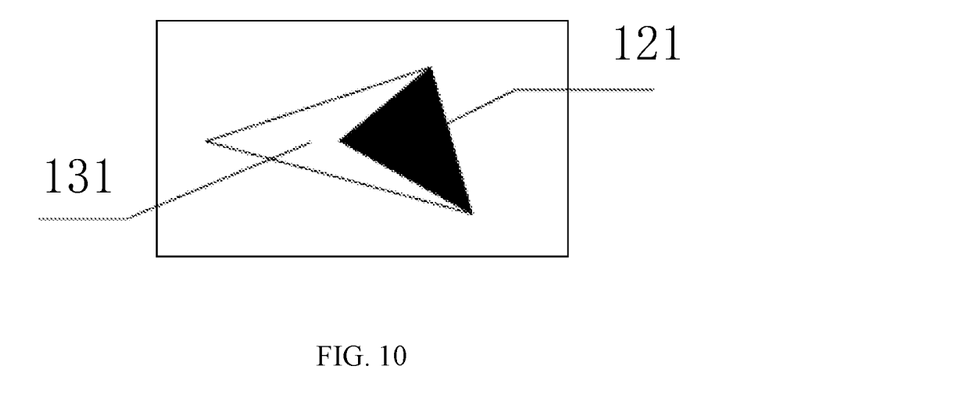
FIG. 10 illustrates a second schematic diagram of another 3D target object according to the exemplary method in FIG. 2 according to some embodiments of the present disclosure.

FIG. 9 illustrates a first bitmap image generated according to the exemplary method in FIG. 2 according to some embodiments of the present disclosure. As shown in FIG. 9, the first bitmap image, which is corresponding to the binary bitmap image in FIG. 7, may be a 24-bit bitmap of the layer-color data. Because the 3D target object includes a white portion, the white portion cannot be distinguished from the background image. FIG. 10 illustrates a second schematic diagram of another 3D target object according to the exemplary method in FIG. 2 according to some embodiments of the present disclosure. For illustrative purposes, as shown in FIG. 10, the 3D target object may include a non-white portion 121 and a white portion 131.

Figure 11:
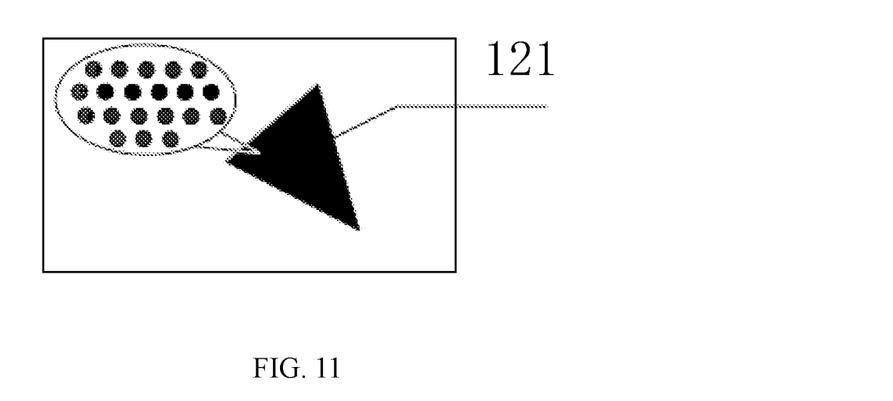
FIG. 11 illustrates a second schematic diagram of a pixel dot array in a non-white portion of another 3D target object according to the exemplary method in FIG. 2 according to some embodiments of the present disclosure.

Further, the layering process may be performed on the 3D target object to obtain the layer-color data and the layer-structure data, which may be extracted and analyzed. FIG. 11 illustrates a second schematic diagram of a pixel dot array in a non-white portion of another 3D target object according to the exemplary method in FIG. 2 according to some embodiments of the present disclosure. As shown in FIG. 11, the pixel dot array may represent the non-white portion 121 of the 3D target object in FIG. 10. Each pixel dot in the pixel dot array may include the layer-color data that stores data in the color system of the red (R), green (G), and blue (B) combination. The layer-color data that stores data in the color system of the red (R), green (G), and blue (B) combination may be extracted from a certain pixel dot in the pixel dot array. Based on the layer-color data, it can be determined that the color of the pixel dot is not white, the pixel dot may be within the non-white portion 121, and the pixel dot may be printed.

Figure 12:
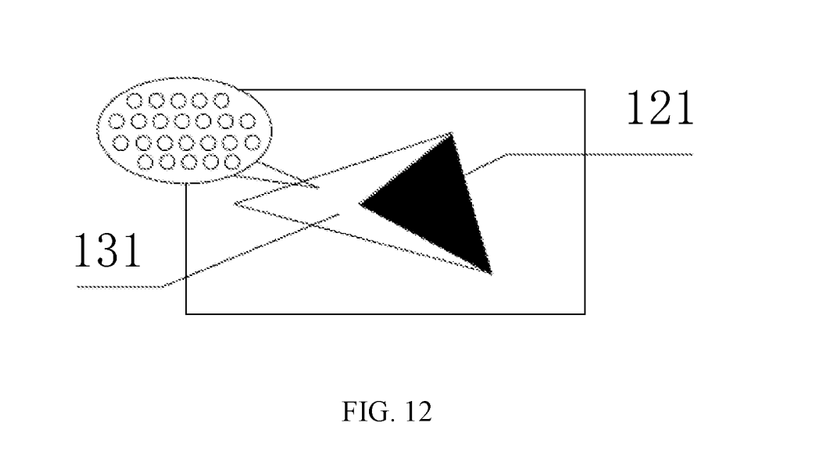
FIG. 12 illustrates a second schematic diagram of a pixel dot array in a white portion of another 3D target object according to the exemplary method in FIG. 2 according to some embodiments of the present disclosure.

FIG. 12 illustrates a second schematic diagram of a pixel dot array in a white portion of another 3D target object according to the exemplary method in FIG. 2 according to some embodiments of the present disclosure. As shown in FIG. 12, the pixel dot array may represent the white portion 131 of the 3D target object in the background image in FIG. 10. Each pixel dot in the pixel dot array may include the layer-color data that stores data in the color system of the red (R), green (G), and blue (B) combination. The layer-color data that stores data in the color system of the red (R), green (G), and blue (B) combination may be extracted from a certain pixel dot in the pixel dot array. Based on the layer-color data, it can be determined that the color of the pixel dot is white. At this point, whether the pixel dot is the background color of the first bitmap image or is within the white portion 131 of the 3D target object may not be determined. As such, the layer-structure data 0 or 1 of the pixel dot contained in the second bitmap image that has one-to-one correspondence with the pixel dot contained in the first bitmap image may be extracted to determine whether the pixel dot is within the background image or is the white portion 131 of the 3D target object.

The present disclosure provides a first operation mode and a second operation mode. The first operation mode includes repeatedly performing a first-part process and a second-part process until the layer colors of all layers of the target object is determined.

The first-part process may include repeatedly performing: performing the layering process on the target object and determining the slice-layer data of a pre-determined number of layers, where the slice-layer data includes the layer-color data and the layer-structure data.

The second-part process may include repeatedly performing: analyzing the layer color data and the layer-structure data of a pre-determined number of layers to determine the layer colors of the pre-determined number of layers of the target object and determining the printing information of the target object. Analyzing the layer color data and the layer-structure data of a pre-determined number of layers may include analyzing the layer-color data and the layer-structure data when the layer-color data is consistent with the background color data of the target object and analyzing the layer-color data when the layer-color data is inconsistent with the background color data of the target object.

In the first operation mode, the pre-determined number of the slice-layer data of the 3D target object may be analyzed to determine the layer colors of the pre-determined number of the layers of the 3D target object. For example, the slicing software may slice a layer of the 3D target object and obtain the slice-layer data of the sliced layer. The layer-color data and the layer-structure data of the slice-layer data may be extracted and analyzed. In the meantime, the slicing software may slice another layer. The same operation may be repeated until the entire 3D target object is completely analyzed.

The second operation mode includes performing a third-part process and a fourth-part process.

The third-part process may include repeatedly performing: performing the layering process on the target object and determining slice-layer data of all layers, where the slice-layer data includes the layer-color data and the layer-structure data.

The fourth-part process may include repeatedly performing: analyzing the layer color data and the layer-structure data of all layers to determine the layer colors of all layers of the target object to determine the printing information of the target object. Analyzing the layer color data and the layer-structure data of all layers may include analyzing the layer-color data and the layer-structure data when the layer-color data is consistent with the background color data of the target object and analyzing the layer-color data when the layer-color data is inconsistent with the background color data of the target object.

In the second operation mode, the slice-layer data of all layers of the 3D target object may be obtained and then analyzed one by one. The layer-color data and the layer-structure data of the slice-layer data of each layer may be analyzed. That is, the layer-color data and the layer-structure data may be extracted and analyzed layer by layer and pixel dot by pixel dot until all layers are analyzed. In the end, the layer colors of the entire target object may be obtained.

In the embodiments of the present disclosure, the layering process may be performed on the target object to determine the slice-layer data of each layer. The slice-layer data may include the layer-color data and the layer-structure data. The layer-color data may represent the color information of the target object. The layer-structure data may represent the printing location of the target object. Based on the number of bitmap images, when the layer-color data is consistent with the background color data, the layer-color data and the layer-structure data may be analyzed, and when the layer-color data is inconsistent with the background color data, the layer-color data may be analyzed. As such, the layer colors of the entire target object may be determined and the printing information of the entire target object may be determined. Thus, a method for full color data processing for 3D objects is provided. The method may include performing the layering process on the 3D target object, analyzing the layer-color data and the layer-structure data of each sliced layer, presenting full color information of the 3D target object in a data format, and distinguishing and avoiding printing omissions or printing mistakes when the color of the sliced layer of the 3D target object is consistent with the color of the background image.

Figure 13:
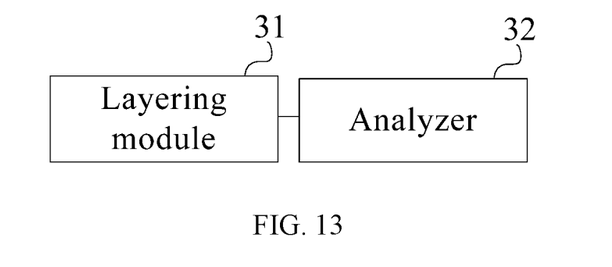
FIG. 13 illustrates a schematic diagram of an exemplary full color data processing apparatus for 3D objects according to some embodiments of the present disclosure.

FIG. 13 illustrates a schematic diagram of an exemplary full color data processing apparatus for 3D objects according to some embodiments of the present disclosure. As shown in FIG. 13, the apparatus may include a layering module 31 and an analyzer 32.

The layering module 31 may be configured to perform the layering process on the target object to determine slice-layer data of each layer. The slice-layer data may include the layer-color data and the layer-structure data. The layer-color data may represent the color information of the target object. The layer-structure data may represent the printing location of the target object.

The analyzer 32 may be configured to analyze the layer-color data and the layer-structure data when the layer-color data is consistent with the background color data of the target object and to analyze the layer-color data when the layer-color data is inconsistent with the background color data of the target object, thereby determining the layer color of the target object and determining the printing information of the target object.

The apparatus for full color data processing for 3D objects may execute the method for full color data processing for 3D objects according to the present disclosure and may share the same operation principle, which will not be repeated.

In the embodiments of the present disclosure, the layering process may be performed on the target object to determine the slice-layer data of each layer. The slice-layer data may include the layer-color data and the layer-structure data. The layer-color data may represent the color information of the target object. The layer-structure data may represent the printing location of the target object. When the layer-color data is consistent with the background color data, the layer-color data and the layer-structure data may be analyzed, and when the layer-color data is inconsistent with the background color data, the layer-color data may be analyzed. As such, the layer colors of the entire target object may be determined and the printing information of the entire target object may be determined. Thus, the method for full color data processing for 3D objects is provided. The method may include performing the layering process on the 3D target object, analyzing the layer-color data and the layer-structure data of each sliced layer, presenting full color information of the 3D target object in a data format, and distinguishing and avoiding printing omissions or printing mistakes when the color of the sliced layer of the 3D target object is consistent with the color of the background image.

Figure 14:
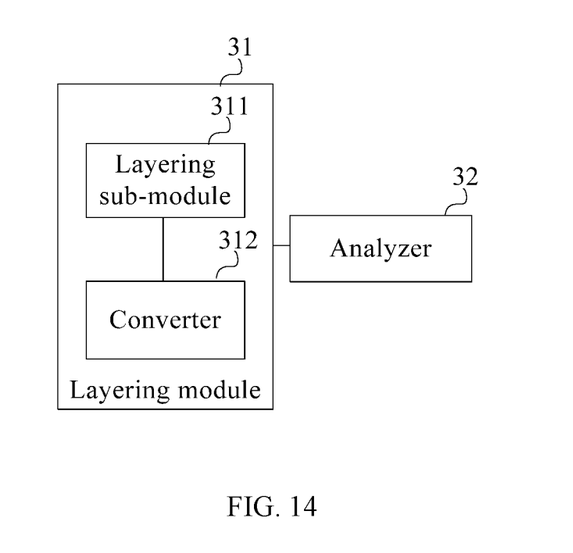
FIG. 14 illustrates a schematic diagram of another exemplary full color data processing apparatus for 3D objects according to some embodiments of the present disclosure.

FIG. 14 illustrates a schematic diagram of another exemplary full color data processing apparatus for 3D objects according to some embodiments of the present disclosure. Like the apparatus in FIG. 13, the apparatus in FIG. 14 may include a layering module 31 and an analyzer 32. The layering module 31 may further include a layering sub-module 311 and a converter 312.

The layering sub-module 311 may be configured to perform the scanning process on the target object to obtain the target object information of the target object, convert the target object information into the data format recognizable by layering and slicing software, perform the layering process on the converted target object information to generate bitmap images, and analyze the bitmap images to determine the slice-layer data of each layer.

The converter 312 may be configured to, after the layering sub-module 311 analyzes the bitmap images and determines the slice-layer data of each layer, convert the color format of the layer-color data of the slice-layer data of each layer to obtain the processed slice-layer data of each layer.

In one embodiment, the analyzer 32 may provide the following functions. When there is one bitmap image, the layer-color data of each pixel dot contained in the bitmap image may be analyzed one by one to determine the content represented by the layer-color data. When the layer-color data is consistent with the background color data of the target object, the layer-structure data of each pixel dot contained in the bitmap image may be analyzed one by one to determine the content represented by the layer-structure data. Based on the contents represented by the layer-color data and the layer-structure data, the layer color of the target object may be determined and the printing information of the target object may be determined. When the layer-color data is inconsistent with the background color data of the target object, based on the content represented by the layer-color data, the layer color of the target object may be determined and the printing information of the target object may be determined.

In another embodiment, the analyzer 32 may provide the following functions. When the bitmap images include a first bitmap image and a second bitmap image, the layer-color data of each pixel dot contained in the first bitmap image may be extracted and analyzed to determine the content represented by the layer-color data. When the layer-color data is consistent with the background color data of the target object, the layer-structure data of each pixel dot contained in the second bitmap image that has one-to-one correspondence with each pixel dot contained in the first bitmap image, may be extracted and analyzed to determine the content represented by the layer-structure data. Based on the content represented by the layer-color data and the content represented by the layer-structure data, the layer color of the target object may be determined and the printing information of the target object may be determined. When the layer-color data is inconsistent with the background color data of the target object, based on the content represented by the layer-color data, the layer color of the target object may be determined and the printing information of the target object may be determined.

The first bitmap image may be a 24-bit bitmap image. The second bitmap image may be a binary bitmap image.

In one embodiment, the apparatus may be configured to repeatedly perform the first-part process and the second portion process until the layer colors of all layers of the target object is determined.

The first-part process may include repeatedly performing: performing the layering process on the target object and determining the slice-layer data of the pre-determined number of layers, where the slice-layer data includes the layer-color data and the layer-structure data.

The second-part process may include repeatedly performing: analyzing the layer-color data and the layer-structure data of the pre-determined number of layers to determine the layer colors of the pre-determined number of layers of the target object and to determine the printing information of the target object. Analyzing the layer-color data and the layer-structure data of the pre-determined number of layers may include analyzing the layer-color data and the layer-structure data when the layer-color data is consistent with the background color data of the target object and analyzing the layer-color data when the layer-color data is inconsistent with the background color data of the target object.

In another embodiment, the apparatus may be configured to perform the third-part process and the fourth-part process.

The third-part process may include repeatedly performing: performing the layering process on the target object and determining the slice-layer data of all layers, where the slice-layer data includes the layer-color data and the layer-structure data.

The fourth-part process may include repeatedly performing: analyzing the layer color data and the layer-structure data of all layers to determine the layer colors of all layers of the target object and to determine the printing information of the target object. Analyzing the layer color data and the layer-structure data of all layers may include analyzing the layer-color data and the layer-structure data when the layer-color data is consistent with the background color data of the target object and analyzing the layer-color data when the layer-color data is inconsistent with the background color data of the target object.

The slice-layer data may also include material information.

In the embodiments of the present disclosure, the layering process may be performed on the target object to determine the slice-layer data of each layer. The slice-layer data may include the layer-color data and the layer-structure data. The layer-color data may represent the color information of the target object. The layer-structure data may represent the printing location of the target object. Based on the number of bitmap images, when the layer-color data is consistent with the background color data, the layer-color data and the layer-structure data may be analyzed, and when the layer-color data is inconsistent with the background color data, the layer-color data may be analyzed.

As such, the layer colors of the entire target object may be determined and the printing information of the entire target object may be determined. The target object may then be full color 3D-printed by a printer according to the determined printing information. Thus, the method for full color data processing for 3D objects is provided. The method may include performing the layering process on the 3D target object, analyzing the layer-color data and the layer-structure data of each sliced layer, presenting the full color information of the 3D target object in the data format, and distinguishing and avoiding printing omissions or printing mistakes in the full color 3D printing process, when the color of the sliced layer of the 3D target object is consistent with the color of the background image.

Further, various functional modules discussed in the disclosed embodiments may be integrated in a single processing module or may be physically independent from each other. In addition, a plurality of modules formed by integrating two or more than two functional modules together may further form a processing module. The integrated modules described above may be realized through hardware or through a combination of hardware and software functional units.

It should be understood by those skilled in the art that all or a portion of the steps of implementing the above described embodiments may be performed by hardware executing program instructions. The program instructions may be stored in a computer readable storage medium. When being executed, the program instructions perform the steps of the above described embodiments. The storage medium may include read-only memory (ROM), random access memory (RAM), magnetic disk, optical disk, or other medium that stores program instructions.

Figure 15:
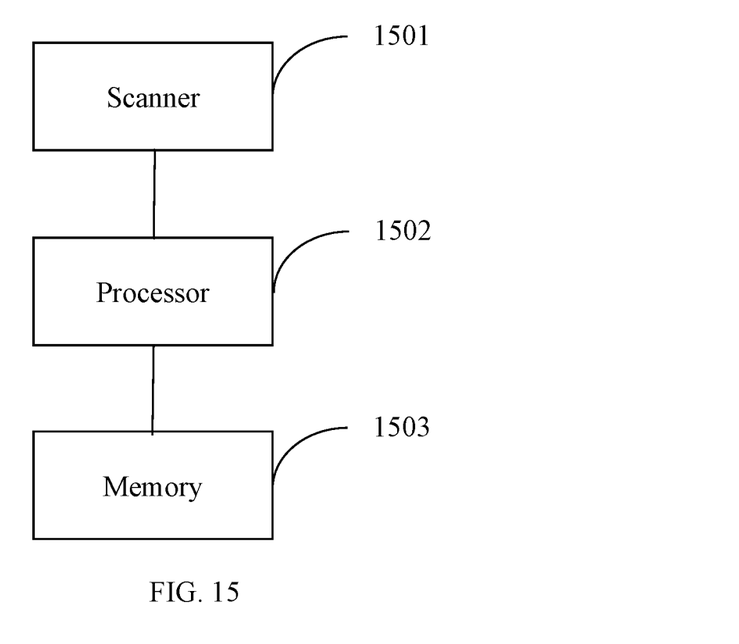
FIG. 15 illustrates a schematic diagram of another exemplary full color data processing apparatus for 3D objects according to some embodiments of the present disclosure.

FIG. 15 illustrates a schematic diagram of another exemplary full color data processing apparatus for 3D objects according to some embodiments of the present disclosure. As shown in FIG. 15, the apparatus may include a scanner 1501, a processor 1502 and a memory 1503.

The scanner 1501 may be configured to perform the scanning process on the target object to obtain the target object information of the target object. The processor 1502 may be configured to convert the target object information into the data format recognizable by layering and slicing software, perform the layering process on the converted target object information to generate bitmap images, analyze the bitmap images to determine the slice-layer data of each layer, and convert the color format of the layer-color data of the slice-layer data of each layer to obtain the processed slice-layer data of each layer. The memory 1503 may be configured to store program instructions to be executed by the processor 1502, the target objection information of the target object, the processed slice-layer data of each layer, and the intermediate data during the processing.

In one embodiment, the processor 1502 may be configured to provide the following functions. When there is one bitmap image, the layer-color data of each pixel dot contained in the bitmap image may be analyzed one by one to determine the content represented by the layer-color data. When the layer-color data is consistent with the background color data of the target object, the layer-structure data of each pixel dot contained in the bitmap image may be analyzed one by one to determine the content represented by the layer-structure data. Based on the contents represented by the layer-color data and the layer-structure data, the layer color of the target object may be determined and the printing information of the target object may be determined. When the layer-color data is inconsistent with the background color data of the target object, based on the content represented by the layer-color data, the layer color of the target object may be determined and the printing information of the target object may be determined.

In another embodiment, the processor 1502 may be configured to provide the following functions. When the bitmap images include a first bitmap image and a second bitmap image, the layer-color data of each pixel dot contained in the first bitmap image may be extracted and analyzed to determine the content represented by the layer-color data. When the layer-color data is consistent with the background color data of the target object, the layer-structure data of each pixel dot contained in the second bitmap image that has one-to-one correspondence with each pixel dot contained in the first bitmap image, may be extracted and analyzed to determine the content represented by the layer-structure data. Based on the content represented by the layer-color data and the content represented by the layer-structure data, the layer color of the target object may be determined and the printing information of the target object may be determined. When the layer-color data is inconsistent with the background color data of the target object, based on the content represented by the layer-color data, the layer color of the target object may be determined and the printing information of the target object may be determined.

The first bitmap image may be a 24-bit bitmap image. The second bitmap image may be a binary bitmap image.

In one embodiment, the processor may be configured to repeatedly perform the first-part process and the second portion process until the layer colors of all layers of the target object is determined.

The first-part process may include repeatedly performing: performing the layering process on the target object and determining the slice-layer data of the pre-determined number of layers, where the slice-layer data includes the layer-color data and the layer-structure data.

The second-part process may include repeatedly performing: analyzing the layer-color data and the layer-structure data of the pre-determined number of layers to determine the layer colors of the pre-determined number of layers of the target object and to determine the printing information of the target object. Analyzing the layer-color data and the layer-structure data of the pre-determined number of layers may include analyzing the layer-color data and the layer-structure data when the layer-color data is consistent with the background color data of the target object and analyzing the layer-color data when the layer-color data is inconsistent with the background color data of the target object.

In another embodiment, the processor 1502 may be configured to perform the third-part process and the fourth-part process.

The third-part process may include repeatedly performing: performing the layering process on the target object and determining the slice-layer data of all layers, where the slice-layer data includes the layer-color data and the layer-structure data.

The fourth-part process may include repeatedly performing: analyzing the layer color data and the layer-structure data of all layers to determine the layer colors of all layers of the target object and to determine the printing information of the target object. Analyzing the layer color data and the layer-structure data of all layers may include analyzing the layer-color data and the layer-structure data when the layer-color data is consistent with the background color data of the target object and analyzing the layer-color data when the layer-color data is inconsistent with the background color data of the target object.

The slice-layer data may also include material information.

In the embodiments of the present disclosure, the layering process may be performed on the target object to determine the slice-layer data of each layer. The slice-layer data may include the layer-color data and the layer-structure data. The layer-color data may represent the color information of the target object. The layer-structure data may represent the printing location of the target object. Based on the number of bitmap images, when the layer-color data is consistent with the background color data, the layer-color data and the layer-structure data may be analyzed, and when the layer-color data is inconsistent with the background color data, the layer-color data may be analyzed.

As such, the layer colors of the entire target object may be determined and the printing information of the entire target object may be determined. The target object may then be full color 3D-printed by a printer according to the determined printing information. Thus, the method for full color data processing for 3D objects is provided. The method may include performing the layering process on the 3D target object, analyzing the layer-color data and the layer-structure data of each sliced layer, presenting the full color information of the 3D target object in the data format, and distinguishing and avoiding printing omissions or printing mistakes in the full color 3D printing process, when the color of the sliced layer of the 3D target object is consistent with the color of the background image.

Above describes embodiments of the present disclosure. It should be understood that the present disclosure is not limited to the above embodiments, and based on the above embodiments, those skilled in the art can make variations or modifications, which are not limited herein. Any variation or modification without creative efforts shall fall within the scope of the claims.

What is claimed is:

1. A method for full color data processing for 3D objects, comprising:

performing a layering process by obtaining a plurality of layers on a target object to determine slice-layer data of each layer, wherein the slice-layer data includes layer-color data and layer-structure data, the layer-color data represents color information of the target object, and the layer-structure data represents a printing location of the target object, wherein performing the layering process on the target object to determine the slice-layer data of each layer includes:

performing a scanning process on the target object to obtain target object information of the target object;

converting the target object information into a data format recognizable by layering and slicing software;

performing the layering process on the converted target object information to generate at least one bitmap image; and analyzing the at least one bitmap image to determine the slice-layer data of each layer; and analyzing the layer-color data and the layer-structure data when the layer-color data is consistent with background color data of the target object and analyzing the layer-color data when the layer-color data is inconsistent with the background color data of the target object, thereby determining a layer color of the target object and determining printing information of the target object, including:

when the at least one bitmap images only includes a bitmap image, analyzing the layer-color data of each pixel dot contained in the bitmap image one by one to determine content represented by the layer-color data;

when the layer-color data is consistent with the background color data of the target object, analyzing the layer-structure data of each pixel dot contained in the bitmap image one by one to determine content represented by the layer-structure data, and based on contents represented by the layer-color data and the layer-structure data, determining the layer color of the target object and determining the printing information of the target object; and when the layer-color data is inconsistent with the background color data of the target object, based on the content represented by the layer-color data, determining the layer color of the target object and determining the printing information of the target object.

2. The method according to claim 1, after analyzing the at least one bitmap image to determine the slice-layer data of each layer, further including:
converting a color format of the layer-color data of the slice-layer data of each layer to obtain processed slice-layer data of each layer.

3. The method according to claim 1, wherein analyzing the layer-color data and the layer-structure data when the layer-color data is consistent with the background color data of the target object and analyzing the layer-color data when the layer-color data is inconsistent with the background color data of the target object, thereby determining the layer color of the target object and determining the printing information of the target object further includes:
when the at least one bitmap images includes a first bitmap image and a second bitmap image, extracting and analyzing the layer-color data of each pixel dot contained in the first bitmap image to determine content represented by the layer-color data;
when the layer-color data is consistent with the background color data of the target object, extracting and analyzing the layer-structure data of each pixel dot contained in the second bitmap image that has one-to-one correspondence with each pixel dot contained in the first bitmap image to determine the content represented by the layer-structure data, and based on the content represented by the layer-color data and the content represented by the layer-structure data, determining the layer color of the target object and determining the printing information of the target object; and
when the layer-color data is inconsistent with the background color data of the target object, based on the content represented by the layer-color data, determining the layer color of the target object and determining the printing information of the target object.

4. The method according to claim 3, wherein:
the first bitmap image is a 24-bit bitmap image; and
the second bitmap image is a binary bitmap image.

5. The method according to claim 1, further comprising:
repeatedly performing a first-part process and a second-part process until the layer colors of all layers of the target object are determined, wherein:
the first-part process includes repeatedly preforming:
performing the layering process on the target object and determining the slice-layer data of a pre-determined number of layers, wherein the slice-layer data includes the layer-color data and the layer-structure data; and the second-part process includes repeatedly performing:
analyzing the layer color data and the layer-structure data of the pre-determined number of layers to determine the layer colors of the pre-determined number of layers of the target object to determine the printing information of the target object, wherein analyzing the layer-color data and the layer-structure data of the pre-determined number of layers includes analyzing the layer-color data and the layer-structure data when the layer-color data is consistent with the background color data of the target object and analyzing the layer-color data when the layer-color data is inconsistent with the background color data of the target object.

6. The method according to claim 1, further comprising:
a third-part process; and
a fourth-part process, wherein:
the third-part process includes repeatedly performing:
performing the layering process on the target object and determining the slice-layer data of all layers, wherein the slice-layer data includes the layer-color data and the layer-structure data; and
the fourth-part process includes repeatedly performing:
analyzing the layer color data and the layer-structure data of all layers to determine the layer colors of all layers of the target object and to determine the printing information of the target object, wherein analyzing the layer color data and the layer-structure data of all layers includes analyzing the layer-color data and the layer-structure data when the layer-color data is consistent with the background color data of the target object and analyzing the layer-color data when the layer-color data is inconsistent with the background color data of the target object.

7. An apparatus for full color data processing for 3D objects, comprising:
a scanner, configured to perform a scanning process on a target object to obtain target object information of the target object;
a memory, storing program instructions for a method for full color data processing; and
a processor, coupled to the scanner and the memory and, when executing the program instructions, configured to:
perform a layering process by obtaining a plurality of layers on a target object to determine slice-layer data of each layer, wherein the slice-layer data includes layer-color data and layer-structure data, the layer-color data represents color information of the target object, and the layer-structure data represents a printing location of the target object, wherein performing the layering process on the target object to determine the slice-layer data of each layer includes:
performing a scanning process on the target object to obtain target object information of the target object;
converting the target object information into a data format recognizable by layering and slicing software;
performing the layering process on the converted target object information to generate at least one bitmap image; and
analyzing the at least one bitmap image to determine the slice-layer data of each layer; and
analyze the layer-color data and the layer-structure data when the layer-color data is consistent with background color data of the target object and analyze the layer-color data when the layer-color data is inconsistent with the background color data of the target object, thereby determining a layer color of the target object and determining printing information of the target object, including:
  when the at least one bitmap image only includes a bitmap image, analyze the layer-color data of each pixel dot contained in the bitmap image one by one to determine content represented by the layer-color data;
  when the layer-color data is consistent with the background color data of the target object, analyze the layer-structure data of each pixel dot contained in the bitmap image one by one to determine content represented by the layer-structure data, and based on contents represented by the layer-color data and the layer-structure data, determine the layer color of the target object and determine the printing information of the target object; and
  when the layer-color data is inconsistent with the background color data of the target object, based on the content represented by the layer-color data, determine the layer color of the target object and determine the printing information of the target object.

8. The apparatus according to claim 7, after analyzing the bitmap images to determine the slice-layer data of each layer, the processor is configured to:
  convert a color format of the layer-color data of the slice-layer data of each layer to obtain processed slice-layer data of each layer.

9. The apparatus according to claim 7, wherein analyzing the layer-color data and the layer-structure data when the layer-color data is consistent with the background color data of the target object and analyzing the layer-color data when the layer-color data is inconsistent with the background color data of the target object, thereby determining the layer color of the target object and determining the printing information of the target object further includes:
  when the at least one bitmap image includes a first bitmap image and a second bitmap image, extracting and analyzing the layer-color data of each pixel dot contained in the first bitmap image to determine content represented by the layer-color data;
  when the layer-color data is consistent with the background color data of the target object, extracting and analyzing the layer-structure data of each pixel dot contained in the second bitmap image that has one-to-one correspondence with each pixel dot contained in the first bitmap image to determine the content represented by the layer-structure data, and based on the content represented by the layer-color data and the content represented by the layer-structure data, determining the layer color of the target object and determining the printing information of the target object; and
  when the layer-color data is inconsistent with the background color data of the target object, based on the content represented by the layer-color data, determining the layer color of the target object and determining the printing information of the target object.

10. The apparatus according to claim 7, wherein the processor is further configured to:
  repeatedly perform a first-part process and a second-part process until the layer colors of all layers of the target object is determined, wherein:
    the first-part process includes repeatedly performing:
      performing the layering process on the target object and determining the slice-layer data of a pre-determined number of layers, wherein the slice-layer data includes the layer-color data and the layer-structure data; and
    the second-part process includes repeatedly performing:
      analyzing the layer color data and the layer-structure data of the pre-determined number of layers to determine the layer colors of the pre-determined number of layers of the target object and to determine the printing information of the target object, wherein analyzing the layer-color data and the layer-structure data of the pre-determined number of layers includes analyzing the layer-color data and the layer-structure data when the layer-color data is consistent with the background color data of the target object and analyzing the layer-color data when the layer-color data is inconsistent with the background color data of the target object.

11. The apparatus according to claim 7, wherein the processor is further configured to perform:
  a third-part process; and
  a fourth-part process, wherein:
    the third-part process includes repeatedly performing:
      performing the layering process on the target object and determining the slice-layer data of all layers, wherein the slice-layer data includes the layer-color data and the layer-structure data; and
    the fourth-part process includes repeatedly performing:
      analyzing the layer color data and the layer-structure data of all layers to determine the layer colors of all layers of the target object to determine the printing information of the target object, wherein analyzing the layer color data and the layer-structure data of all layers includes analyzing the layer-color data and the layer-structure data when the layer-color data is consistent with the background color data of the target object and analyzing the layer-color data when the layer-color data is inconsistent with the background color data of the target object.

12. A non-transitory computer readable storage medium containing computer-executable program instructions for, when executed by a processor, performing a method for full color data processing for 3D objects, the method comprising:
  performing a layering process by obtaining a plurality of layers on a target object to determine slice-layer data of each layer, wherein the slice-layer data includes layer-color data and layer-structure data, the layer-color data represents color information of the target object, and the layer-structure data represents a printing location of the target object, wherein performing the layering process on the target object to determine the slice-layer data of each layer includes:
    performing a scanning process on the target object to obtain target object information of the target object;
    converting the target object information into a data format recognizable by layering and slicing software;
    performing the layering process on the converted target object information to generate at least one bitmap image; and
  analyzing the at least one bitmap image to determine the slice-layer data of each layer; and analyzing the layer-color data and the layer-structure data when the layer-color data is consistent with background color data of the target object and analyzing the layer-color data when the layer-color data is inconsistent with the background color data of the target object, thereby determining a layer color of the target object and determining printing information of the target object, including:

when the at least one bitmap image only includes a bitmap image, analyzing the layer-color data of each pixel dot contained in the bitmap image one by one to determine content represented by the layer-color data;

when the layer-color data is consistent with the background color data of the target object, analyzing the layer-structure data of each pixel dot contained in the bitmap image one by one to determine content represented by the layer-structure data, and based on contents represented by the layer-color data and the layer-structure data, determining the layer color of the target object and determining the printing information of the target object; and    when the layer-color data is inconsistent with the background color data of the target object, based on the content represented by the layer-color data, determining the layer color of the target object and determining the printing information of the target object.

13. The method according to claim 12, after analyzing the bitmap images to determine the slice-layer data of each layer, further including:

converting a color format of the layer-color data of the slice-layer data of each layer to obtain processed slice-layer data of each layer.

14. The method according to claim 12, wherein analyzing the layer-color data and the layer-structure data when the layer-color data is consistent with the background color data of the target object and analyzing the layer-color data when the layer-color data is inconsistent with the background color data of the target object, thereby determining the layer color of the target object and determining the printing information of the target object further includes:

when the at least one bitmap image includes a first bitmap image and a second bitmap image, extracting and analyzing the layer-color data of each pixel dot contained in the first bitmap image to determine content represented by the layer-color data;

when the layer-color data is consistent with the background color data of the target object, extracting and analyzing the layer-structure data of each pixel dot contained in the second bitmap image that has one-to-one correspondence with each pixel dot contained in the first bitmap image to determine the content represented by the layer-structure data, and based on the content represented by the layer-color data and the content represented by the layer-structure data, determining the layer color of the target object and determining the printing information of the target object; and    when the layer-color data is inconsistent with the background color data of the target object, based on the content represented by the layer-color data, determining the layer color of the target object and determining the printing information of the target object.

\* \* \* \* \*